M. H. MANN.
ICE PICK.
APPLICATION FILED NOV. 27, 1908.

926,346.

Patented June 29, 1909.

Witnesses

Inventor:
Miles H. Mann
by Bakewell & Cornwall
Att'y's.

UNITED STATES PATENT OFFICE.

MILES H. MANN, OF LOUISIANA, MISSOURI, ASSIGNOR TO FRANK W. BUFFUM, OF LOUISIANA, MISSOURI.

ICE-PICK.

No. 926,346.  Specification of Letters Patent.  Patented June 29, 1909.

Application filed November 27, 1908. Serial No. 464,532.

*To all whom it may concern:*

Be it known that I, MILES H. MANN, a citizen of the United States, residing at Louisiana, Missouri, have invented a certain new and useful Improvement in Ice-Picks, of which the following is a full, clear, and exact description, such as will enable others skilled in the art to which it appertains to make and use the same, reference being had to the accompanying drawings, forming part of this specification, in which—

Figure 1:
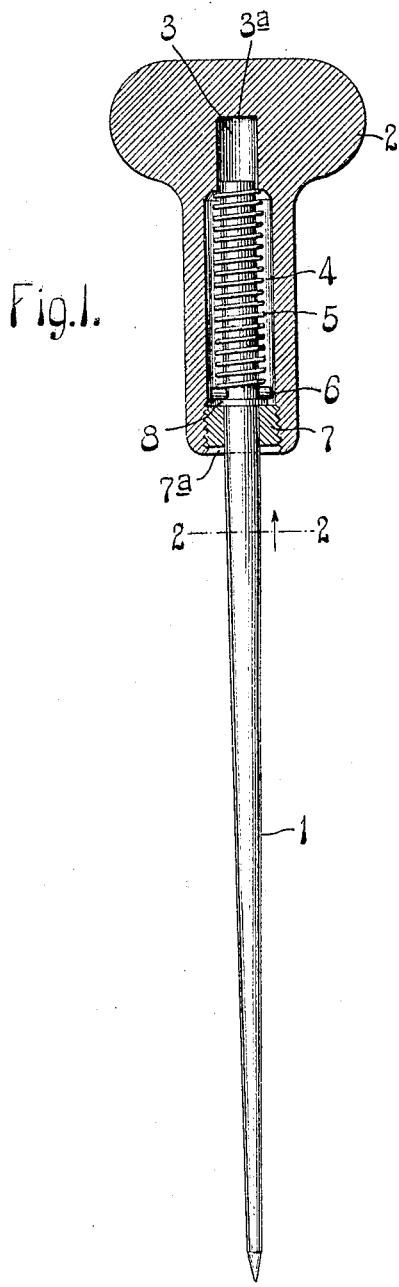
Figure 2:
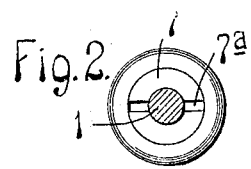

Figure 1 is an elevational view, partly in vertical section, of an ice-pick constructed in accordance with my invention; and Fig. 2 is a cross sectional view taken approximately on the line 2—2 of Fig. 1, looking in the direction of the arrow.

This invention relates to ice-picks, and particularly to that type which comprise a sharp-pointed pick or shank and a heavy handle or head reciprocatingly mounted on the upper end of said shank and adapted to be used as a striking member to force the pointed end of the shank into the ice.

The main object of my invention is to provide an ice-pick of simple construction that is strong and which can be manufactured at a low cost.

Referring to the drawings which illustrate the preferred form of my invention, 1 designates a round shank having a sharp-pointed end, and 2 designates a handle or head that is reciprocatingly mounted on the upper end of said shank. The head 2 is provided with a socket 3 into which the upper end of the shank projects, and below said socket is a longitudinally extending bore 4 of greater diameter than the socket 3. A coiled spring 5 surrounds the portion of the shank 1 that extends through said bore, and the upper and lower ends of said spring bear against the upper end wall of the bore 4 and a cross pin 6 on the shank. The shank 1 is held in position by means of a nut 7 that is screwed into the lower end of the bore 4, and a washer 8 is arranged between the inner face of the nut 7 and the cross pin 6, the nut 7 being provided with an opening through which the shank passes, and also having a slot 7ª formed in its outer face to receive a screw-driver or other suitable tool.

In operation, the head 2 is moved downwardly on the shank so that the upper end wall 3ª of the socket 3 will come in contact with the upper end face of the shank and thus impart a blow to the shank that will force it into the ice, the spring 5 operating to restore the head to its normal elevated position.

An ice-pick of the construction above described comprises few parts and can be manufactured at a low cost, and as the head 2 acts directly on the end of the shank 1 instead of on a pin or other separate piece connected to the shank, the device is very strong and can be used for a long period without wearing out or becoming broken.

While I have stated that the tool herein shown is adapted to be used as an ice-pick I wish it to be understood that it could be used for various other purposes, such, for example, as a prick punch, and therefore my invention is not limited to an ice-pick or a tool for splitting or breaking ice.

Having thus described my invention, what I claim as new and desire to secure by Letters Patent is:

1. An ice-pick comprising a heavy head having a longitudinally extending bore and a socket of less diameter than the bore and located at the inner end thereof, a shank on which said head is reciprocatingly mounted, the upper end of said shank being adapted to contact with the end wall of said socket when the head is moved downwardly on the shank, a coiled spring surrounding said shank and arranged between a shoulder thereon and a shoulder on said head, and a nut screwed into the lower end of the bore in the head for limiting the outward movement of the shank.

2. An ice-pick comprising a heavy head having a longitudinally extending bore and a socket of less diameter than the bore and located at the inner end thereof, a shank on which said head is reciprocatingly mounted, the upper end of said shank being adapted to contact with the end wall of the socket in the head when the head is moved downwardly on the shank, a coiled spring arranged in said bore and surrounding said shank, a cross pin on said shank which confines the spring in said socket, a nut screwed into the lower end of the bore in the head and coöperating with said pin to limit the movement of the head relatively to the shank, and a washer interposed between the inner face of said nut and the cross pin on said shank; substantially as described.

In testimony whereof I hereunto affix my signature in the presence of two witnesses, this twenty-fifth day of November, 1908.

MILES H. MANN.

Witnesses:
 WELLS L. CHURCH,
 GEORGE BAKEWELL.